June 4, 1968 G. MUTZ ET AL 3,386,376
DAMPING MEANS TO PREVENT PRINT HAMMER REBOUND
Filed Sept. 2, 1966 2 Sheets-Sheet 1

INVENTORS
Gerhard Mutz
Gerd Grunwald by
Michael J. Striker
ATTY

June 4, 1968  G. MUTZ ET AL  3,386,376
DAMPING MEANS TO PREVENT PRINT HAMMER REBOUND
Filed Sept. 2, 1966  2 Sheets-Sheet 2
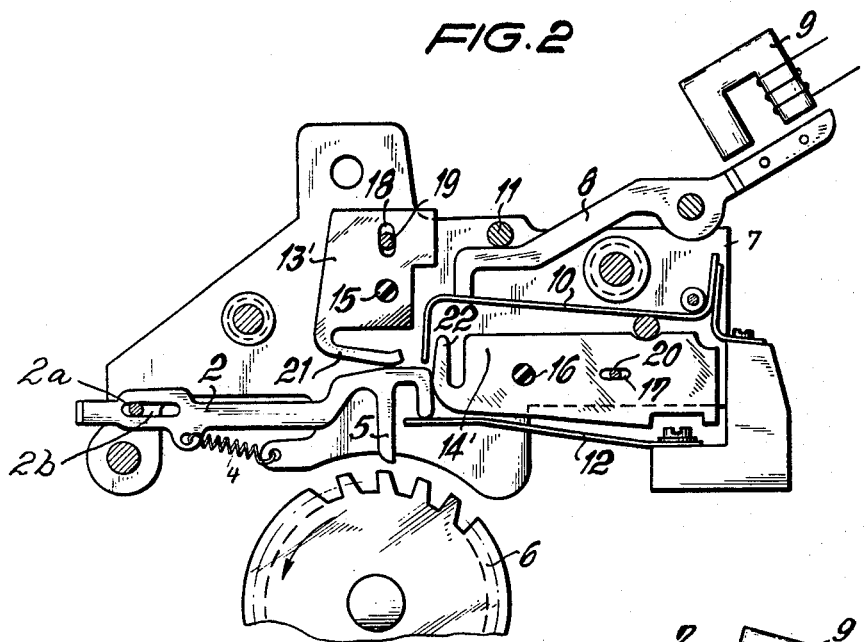
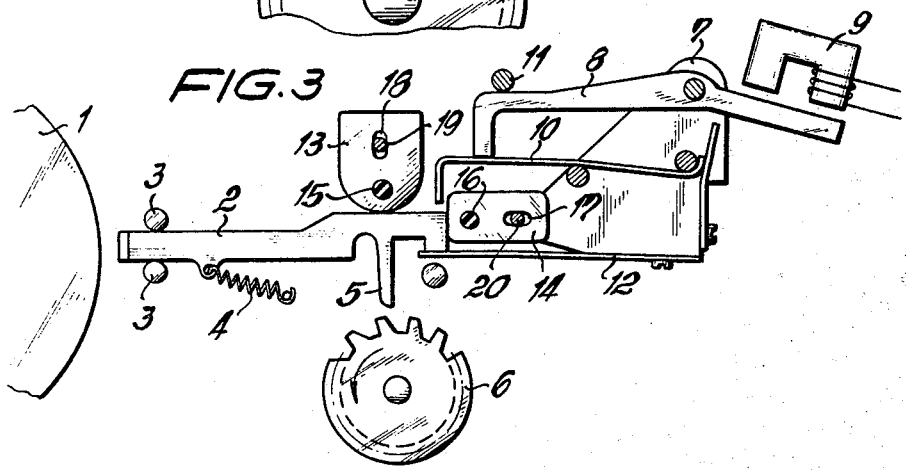
INVENTORS
Gerhard Mutz
Gerd Gronwald
by Michael J. Striker
Atty United States Patent Office 3,386,376
Patented June 4, 1968

3,386,376
DAMPING MEANS TO PREVENT PRINT
HAMMER REBOUND
Gerhard Mutz and Gerd Gronwald, Villingen, Germany,
assignors to Kienzle Apparate GmbH, Villingen, Black
Forest, Germany
Filed Sept. 2, 1966, Ser. No. 577,014
Claims priority, application Germany, Sept. 8, 1965,
K 57,075
11 Claims. (Cl. 101—93)

ABSTRACT OF THE DISCLOSURE

The rebound of a printing hammer is dampened by a collision with a resiliently mounted oscillatory damping means whose mass and resiliency are selected so that a second collision cannot take place during oscillation of the damping means.

---

The present invention relates to a damping system for rebounding bodies, and more particularly to a damping system for precision apparatus operating at high speed.

In apparatus of this type, the problem occurs that movable parts such as contacts, or printing hammers, which are very rapidly accelerated but perform only small working strokes, rebound and perform more than one operation so that, for example, a printing hammer produces two imprints, while a rebounding contact may establish a wrong connection.

Attempts have been made to prevent the rebounding of mechanical parts operating at high speed, or at least to eliminate detrimental effects caused by the rebounds. It is known to provide oscillatory damping masses cooperating with the rebounding parts substantially according to the principles of elastic collision, as exemplified by a pair of colliding billiard balls. An oscillatory mass is disposed in the path of movement of a rebounding part so that the same collides with the mass and transfers a great part of its kinetic energy to the oscillatory damping mass. In the known arrangements, the oscillatory damping mass is either connected by springs to a stationary point, or is maintained in a normal position of rest by a permanent magnet. In the first case, in which the oscillatory damping mass is held by a spring, complete damping of the rebound cannot be obtained with certainty, since the spring permits the movement of the damping mass away from the rebounding part after the collision, but resiliently swings back to its former position so that it again collides with the oscillating part, which may again cause driving of the part to the position from which it rebounded, for example a printing hammer may be driven by a second collision with the damping mass to make a second imprint.

In the event that an oscillatory damping mass is held in a position of rest by a permanent magnet, the kinetic energy of the rebounding working part is partly consumed by the energy required for tearing off the damping mass from the permanent magnet, which takes place during the collision between the working part and the damping mass. The energy required for separating the damping mass from the permanent magnet is of such a magnitude that the following oscillation of the damping mass is dampened to such an extent that it does not return into the effective magnetic field of the magnet, but engages the worknig part, which in the meantime has come to a standstill. In such an arrangement, the damping of the rebound movement is not properly effected by transferring energy to the oscillatory damping mass, but is caused by the fact that the working part must use up its kinetic energy for tearing off the damping mass from the holding permanent magnet. Such an arrangement is complicated, particularly since for each working part, for example for all hammers of a printing business machine, a permanent magnet and a damping mass have to be provided.

It is one object of the invention to overcome the disadvantages of the prior art concerned with the problem of damping rebound motions of a working part, and to provide a damping system which operates absolutely reliably to prevent undesired repeat operations caused by rebounds of a working part.

Another object of the invention is to prevent a second collision between a working part and a damping mass after energy has been transferred during a first collision from the rebounding working part to the damping mass.

Another object of the invention is to provide a damping system for an oscillatory working part in which an oscillatory working part of an apparatus collides with a resiliently mounted oscillatory damping means only once so that retransfer of energy from the damping means to the working part is prevented.

With these objects in view, the present invention relates to a damping system which is particularly suited for precision apparatus having working parts driven at high speed to perform a working stroke in one direction and a return stroke in the opposite direction.

One embodiment of the invention comprises oscillatory damping means having a predetermined mass and being resiliently mounted; movable means, such as a spring-biased printing hammer having a predetermined mass and resiliency; mounting means for mounting the damping means and the movable means adjacent each other for oscillatory movement; and means for causing a forward movement of the movable means away from the damping means and a rebound movement toward the same.

The rebounding means collides with the damping means and causes oscillation of the same, and then continues to oscillate in a dampened oscillatory movement. The masses and elasticities of the damping means and of the movable means are selected so that the duration of self-sustained dampened oscillations of the damping means is so much smaller than the oscillation time of the movable means that a second collision and retransfer of energy from the damping means to the movable means is prevented. The movable means includes a body and a resilient means connected to the body, and the damping means include a wear resistant body mounted on a resilient mounting means. In the preferred embodiment of the invention, the body of the damping means is mounted on rubber, while the dampened working part is connected with a metal spring.

The function of the damping system of the invention will be best understood with reference to an example. Assuming that a moving billiard ball collides with a motionless billiard ball having the same mass and elasticity, the moving ball stops, and the other ball moves away at the speed of the previously moving ball, since the entire kinetic energy is transferred from the moving ball to the motionless ball and causes the same to move. These conditions cannot be exactly applied to a mechanism, since the masses have to return to the initial position after a collision, and consequently it cannot be avoided that both masses are elastically supported or held. In order to arrive at a proper dimensioning of the colliding masses and of the resilient means associated with the same, the following must be considered.

Both colliding parts, namely the working part as well as the damping means, will in any event perform a dampened oscillation after the collision. The time during which the damping of the oscillatory movements takes place depend on the masses as well as on the coefficients of elasticity of the resilient means associated with the respective mass.

In order to obtain the desired result, namely prevention of a retransfer of energy from the damping means to the working part after the collision, a second collision must be prevented.

This is obtained in accordance with the invention by suitably selecting the resiliencies and masses of the damping means and of the dampened part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a fragmentary schematic elevation illustrating an embodiment of the invention; and FIG. 3 is a fragmentary schematic side elevation illustrating a modified embodiment of the invention.

Figure 1:
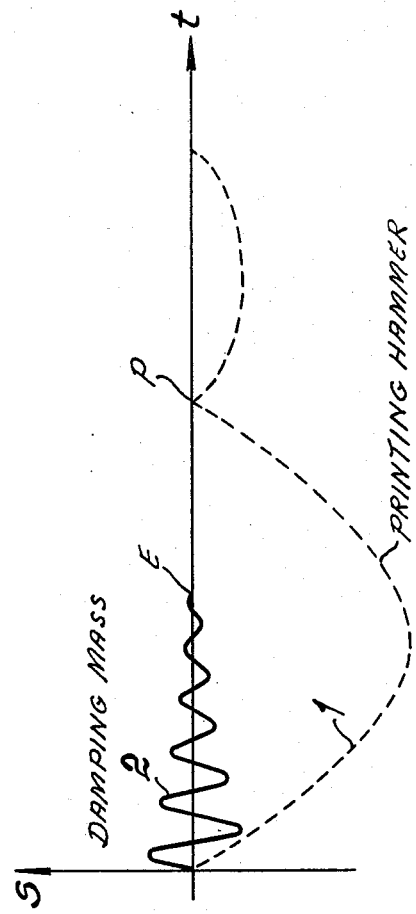
FIG. 1 is a diagram illustrating the amplitude of the oscillations of the working part and damping means after a collision.

Referring now particularly to FIG. 1, graph 1 represents the oscillatory motion of a movable working part, and graph 2 illustrates the oscillatory motion of a damping means. The ordinates S represent amplitudes of the oscillatory motions, and the abscissa represents time. The rebounding working part has a collision with the damping means at the point of origin of the systems of coordinates. Energy has been transferred from the rebounding working part to the damping means so that the same oscillate as indicated by the graph 2 and after a certain time come to a standstill. A second collision between the oscillating damping means and the working part must be prevented, in other words graph 1 must not cross graph 2. As shown in FIG. 1, graph 1 substantially extends from the origin in a direction tangential to the amplitude peaks of graph 2 without touching graph 2. The working part whose movement is represented by graph 1 moves away from the damping means after the collision, but must oscillate at such a low frequency that the more rapidly oscillating damping means does not again collide with the working part during its first oscillation while the amplitude peaks of the oscillating damping means are greatest, or thereafter as the amplitude of the oscillations of the damping means is gradually reduced. The working part returns to the initial position only after the damping means has come to a standstill so that none of the kinetic energy transferred from the working part to the damping means during the initial collision, can be retransferred to the working part whose following motion has a small amplitude so that the initial function of the working part is not again produced, for example, a printing hammer is not again thrown into the printing position.

It has been found in accordance with the present invention that an oscillatory motion of short wave length, as is required of the damping means, can be best obtained by mounting the body or mass of the damping means on a soft elastomer, such as rubber or a soft synthetic elastic material. The working part is preferably biased by a metal spring to assume a normal position. In this manner, the damping means has a far higher coefficient of elasticity than the working part since the hard metal spring has a far lower coefficient of elasticity than the rubber support of the damping mass.

In order to obtain an initial slope of graph 1 steeper than a tangent from the origin to the respective peak of graph 2, the masses of the working part and of the damping means must be in a certain predetermined relation. The initial gradient of graph 1 in relation to graph 2 is a measure of the rebound speed of the working part. If the tangent of graph 1 in the first negative maximum of graph 2 is determined, it is found that $$V_{1R} \approx -\frac{2}{3\pi} \cdot V_{2R}$$

wherein $V_{1R}$ is the rebound speed of the working part, and $V_{2R}$ is the rebound speed of the damping means. The ratio between the masses of the working part and of the damping means must be correspondingly selected to obtain the above relationship between the rebound speeds. Under consideration of the theory of collision, and of the collision factor for a part elastic collision and by reducing the effective masses of the colliding parts to the mass effective at the point of collision, the necessary ratio between the masses of the damping means and working part can be calculated to obtain the desired effect.

For a part elastic collision the following formula are valid:

(1) $$V_1R = \frac{m_1 \cdot V_1 + m_2 \cdot V_2 - m_2(V_1 - V_2) \cdot K}{m_1 + m_2}$$

(2) $$V_2R = \frac{m_1 \cdot V_1 + m_2 \cdot V_2 + m_1(V_1 - V_2) \cdot K}{m_1 + m_2}$$

wherein:

$V_1R$ = rebound speed of working part
$V_2R$ = rebound speed of damping means
$V_1$ = speed of working part before collision
$V_2$ = speed of damping means before collision
$m_1$ = mass of working part
$m_2$ = mass of damping means
$K$ = coefficient of collision Since in the present case the damping means is at rest before the collision and $V_2$ therefore $=0$ the above formula can be reduced to the following:

(3) $$V_1R = \frac{m_1 \cdot V_1 - m_2 V_1 \cdot K}{m_1 + m_2}$$

(4) $$V_2R = \frac{m_1 \cdot V_1 + m_1 V_1 \cdot K}{m_1 + m_2}$$

Since $$V_1R = -\frac{2}{3\pi} \cdot V_2R$$

it is (5) $$\frac{m_1 \cdot V_1 - m_2 \cdot V_1 \cdot K}{m_1 + m_2} = -\frac{2}{3\pi} \cdot \frac{m_1 \cdot V_1 + m_1 V_1 \cdot K}{m_1 + m_2}$$

If this equation is solved to $m_2$ (6) $$m_2 = m_1 \frac{2 + 3\pi + 2K}{3\pi K}$$

This formula can now be used to compute the mass $m_2$ of the damping means for a given mass $m_1$ of the working part taking into consideration the coefficient of collision K. Practical experience shows that the exact value of K is not only dependent on the material of which the colliding masses are made, but also of the speed with which the masses collide. In tests it has been verified that it is possible to obtain a coefficient of collision which comes very near the value 1 ($K=1$ is valid for a fully elastic collision), in fact a value, which varies only between 0.75 and 0.9, if one provides the damping means with resilient noses of the same material. These noses have the effect, that practically no part of the kinetic energy of the rebounding working part is transformed into heat, but practically all the kinetic energy is used up in the elastic deformation of the resilient noses of the damping means.

As for the coefficient of elasticity of the elastic means of the working part and of the damping means, it is fully sufficient if these differ by the order of magnitude. This object is reached by spring means actuating the working part and by mounting the damping means on a pin or such like of a soft elastomer as already mentioned.

FIGS. 2 and 3 illustrate high speed printers of the type used for business machines. Printing types are provided on a rotary printing cylinder 1, only shown in FIG. 3. In each embodiment, a row of printing hammers 2 is provided, and the printing hammers are mounted in the embodiment of FIG. 3 between a pair of guide rods 3, and in the embodiment of FIG. 2 on a pin 2a passing through aligned slots 2b of the printing hammers 2. Springs 4 are secured to the hammers 2 and pull the same to the right as viewed in the drawing to a position of rest spaced from the printing roller 1. Each printing hammer has a coupling portion 5 projecting into the proximity of the periphery of a toothed power drive roll 6. Each printing hammer 2 is associated with an electromagnet 9 having an armature 8 mounted for pivotal movement on a bracket 7. Wire springs 10 are resiliently pretensioned to abut armatures 8 and to hold the same in a position of rest abutting a stop pin 11 extending across all armatures. Springs 12 are mounted on the frame and respectively abut projections of associated printing hammers 2 to hold the same in a normal position of rest.

If a selected electromagnet 9 is energized by an impulse associated with a character to be printed, respective armature 8 is attracted and depresses the respective spring 10 to a positon in which its bent end portion engages the respective associated printing hammer 2 and presses the same downward against the action of the respective spring 12 to a position in which the coupling portion 5 projects into a recess between two teeth of drive roll 6 which rotates at high speed.

The respective printing hammer is thrown rapidly to the left so that its front face presses a sheet of paper, not shown, against the opposite type face of printing means 1 to produce an imprint.

Due to the action of spring 12, the rear end of the respective printing hammer 2 is raised as soon as it is out of engagement with the bent projection of the respective spring 10, and since the engaging tooth of drive wheel 6 also moves downward along a circular path, the tooth of power drive roll 6 separates from coupling projection 5 of the printing hammer 2 before the same engages printing roller 1. The imprint is made under the action of the inertia of the printing hammer, and immediately thereafter, spring 4 retracts the printing hammer to its initial position of rest shown in the drawing. The printing hammer rebounds and has a tendency to oscillate in the direction of its printing movement, but also in a transverse direction since the rear end of the printing hammer is completely free to perform transverse movements. A transverse oscillation may cause reengagement of coupling portion 5 with drive roll 6 and an undesired second imprint. However, even without engagement of the drive roll 6, the printing hammer may rebound to produce a second imprint.

In order to prevent uncontrolled movements of the printing hammer in the embodiment of FIG. 3, damping means 13 and 14 are provided. A plate-shaped body 14 is located rearwardly of and adjacent each printing hammer 2, and all bodies 14 are mounted on a transverse pin 20 extending through elongated slots 17 which permit a movement of each body 14 in the direction in which printing hammer 2 moves to and from the printing position. All bodies 14 are mounted on a transverse pin 16 consisting of an elastic material such as natural or synthetic rubber, and consequently each damping means 14 is capable of performing oscillations in forward and rearward direction.

A series of damping means 13 is provided transversely adjacent and above associated printing hammers 2. Each damping means 13 is a plate-shaped body having a transverse slot 18 through which a common pin 19 passes so that bodies 13 are mounted for transverse or upward and downward movement. A common pin 15 consisting of natural or synthetic rubber passes through all plate-shaped bodies 13 and supports the same.

The coefficients of elasticity of the rubber mountings 15 and 16, and the masses of bodies 13 and 14 are selected in accordance with the invention in a certain relationship to the mass of the printing hammer 2 and to the coefficient of elasticity of the metal spring 4, and due to the softness of the rubber mountings 15 and 16, they have a substantially higher coefficient of elasticity than metal spring 4.

When after an imprint a printing hammer 2 is retracted by spring 4, it collides with bodies 14 and 13 which due to the softness of rubber pins 15, 16 move rapidly away from the printing hammer which moves comparatively slowly away from bodies 13 and 14. These movements are illustrated by the first portions of graphs 1 and 2 starting at the origin. When bodies 13 and 14 quickly bounce back toward the printing hammer, they do not collide again with the printing hammer which still moves in the same direction, as is apparent from graph 1 which does not intersect with the first negative peak of graph 2. Consequently, no second collision takes place and the printing hammer cannot be thrown against the printing roller 1. The oscillation of the bodies 13 and 14 comes to an end at a point E before the printing hammer returns to its initial position at the point P as shown in FIG. 1, due to the fact that the duration of self-sustained oscillations of the damping means 13 to 16 after the collision is shorter than the oscillation time of the movable printing so that the oscillation 2 is terminated when the hammer returns to its initial position after one oscillation.

In the embodiment of FIG. 2, the plate-shaped bodies 13' and 14' have bent noses 21 and 22 at the ends thereof which are adjacent printing hammer 2. Noses 21 and 22 effect a predetermined coupling of the printing hammer to the damping bodies 13' and 14'.

In the given example the mass $m_1$ of the printing hammer 2 is 1.8 g. If this is inserted in Equation 6 above with a coefficient of collision $K=0.75$, a mass $m_2$ of the damping body 14 or 14' of 3.3 g. is computed.

For arriving at the mass $m_2$ of the damping means 13 and 13' it is necessary to reduce the mass $m_1$ of the printing hammer 2 to a value with which it becomes effective at the point of collision and to insert this value into Equation 6.

It will be understood that each of the elements described above, or two or more together, may also find a useful application in other types of damping systems for oscillating parts differing from the types described above.

While the invention has been illustrated and described as embodied in a damping system in which the oscillation time of the damping means is smaller than the oscillation time of a working part so that after a collision, a second collision and retransfer of energy from the oscillation damping means to the working part is prevented, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Damping system comprising, in combination, movable means having a predetermined mass and resiliency; supporting means supporting said movable means for oscillatory movement from and to an initial position; damping means having a predetermined mass; resilient mounting means for mounting said damping means for oscillatory movement from and to an initial position in which said damping means is located adjacent said movable means in said initial position of the same; means for causing a forward movement of said movable means out of said initial position and away from said damping means, and a rebound movement toward said damping means so that the rebounding movable means collides with said damping means and causes oscillation of the same, and then continues to oscillate in a dampened oscillation; the mass and resiliency of said movable means, and of said damping means, and the resiliency of said mounting means being selected so that the self-sustained oscillation of said damping means terminates before said movable means returns to the initial position thereof so that during oscillation of said damping means a second collision cannot occur and no energy is retransferred from said damping means to said movable means.

2. Damping system as claimed in claim 1, wherein said damping means is made of a hard wear-resistant material.

3. Damping system as claimed in claim 1, wherein said movable means includes a movable body and a resilient means biassing said body toward said damping means; and wherein said resilient mounting means has a substantially higher coefficient of elasticity than said resilient means.

4. Damping system as claimed in claim 3, wherein said resilient mounting means is made of a soft elastomer, and said resilient means and said damping means and said movable body are made of metal.

5. Damping system as claimed in claim 1, wherein said masses and the resiliencies of said resilient mounting means and of said movable means are selected so that after collision of said masses, said damping means performs a plurality of rapid oscillations of short durations at high frequency at small decreasing amplitudes and comes to a stop before said movable means performs a single oscillation of large amplitude and returns to said initial position thereof.

6. Damping system as claimed in claim 5, wherein said masses and resiliencies are so selected that the amplitude of said single oscillation of said movable means is at any moment greater than the amplitude peaks of the oscillation of said damping means so that a second collision cannot take place.

7. Damping system as claimed in claim 1, wherein said movable means includes a body and resilient means urging said body into said initial position; wherein said supporting means mount said body for movement in two transverse directions; and comprising another damping means, and another resilient mounting means for said other damping means, said two resilient mounting means respectively mounting said two damping means adjacent said body for oscillatory movement in said two transverse directions and for collision with said body when the same moves in each of said transverse directions during said rebound movement, said two resilient mounting means having a substantially smaller resiliency than said resilient means.

8. Damping system as claimed in claim 1, wherein said damping means includes a metal body; wherein said resilient mounting means consists of a soft elastomer; wherein said movable means includes a printing hammer and a spring biassing said printing hammer toward said initial position adjacent said body; wherein said means for causing forward movement includes a continuously rotating power roll; and wherein said printing hammer is driven toward a printing position by said power roll and retracted by said spring to collide with said body, the masses of said body and of said hammer, and the coefficients of elasticity of said spring and said elastomer being selected so that said body of said damping means and said printing hammer oscillate after the collision at such an amplitude and frequency that the paths of said body and said hammer do not intersect during oscillation of said body.

9. Damping system as claimed in claim 1, wherein the resiliencies and masses of said movable means, damping means and of said resilient mounting means are selected so that the amplitude of oscillation of said movable means is at any moment greater than the amplitude peaks of the oscillation of said damping means so that a second collision cannot take place.

10. Damping system as claimed in claim 1, wherein said damping means and said movable means have resilient noses adjacent each other and providing an elastic coupling between said damping means and said movable means elastically deformed during the collision between the same.

11. Damping system comprising, in combination, damping means having a predetermined mass and resiliency and including a first body and a first resilient means; movable means having a predetermined mass and resiliency and including a second body and a second resiliency means; another damping means including a third body and a third resilient means; supporting means mounting said second body for oscillatory movement in two transverse directions; mounting means for mounting said first and third bodies for oscillations in said two transverse directions, respectively, and adjacent said second body, said first and third resilient means having a substantially smaller resilience than said second resilient means; and means for causing movement of said movable means away from said damping means and a rebound movement toward said damping means so that the rebounding movable means collides with said damping means and causes oscillations of the same, and then continues to oscillate in a dampened oscillatory movement; the mass and resiliency of each of said resilient means of said damping means and of said movable means being selected so that the oscillation time of said damping means after the collision is so much smaller than the oscillation time of said movable means that a second collision during oscillation of said damping means, and re-transfer of energy from said damping means to said movable means is prevented.

References Cited

UNITED STATES PATENTS

| | | | |
|---|---|---|---|
| 2,766,686 | 10/1956 | Fomenko et al. | 101—93 |
| 2,895,411 | 7/1959 | Demer et al. | 101—93 |
| 2,897,752 | 8/1959 | Malmros et al. | 101—93 |
| 3,152,540 | 10/1964 | Pensavecchia et al. | 101—93 |
| 3,255,693 | 6/1966 | Eissfeldt et al. | 101—93 |
| 3,292,531 | 12/1966 | Mutz | 101—93 |

WILLIAM B. PENN, *Primary Examiner.*